US006424118B1

(12) United States Patent
Tu

(10) Patent No.: US 6,424,118 B1
(45) Date of Patent: Jul. 23, 2002

(54) MOBILE PHONE SIM CARD SWITCHING UNIT

(76) Inventor: Chih-Chung Tu, No. 88-1, Lane 84, Manping St., Banchiau City, Taipei (TW)

(*) Notice: Subject to any disclaimer, the term of this patent is extended or adjusted under 35 U.S.C. 154(b) by 0 days.

(21) Appl. No.: 09/632,371

(22) Filed: Aug. 3, 2000

(51) Int. Cl.⁷ .................................................. H02J 7/00
(52) U.S. Cl. ....................................... 320/115; 320/114
(58) Field of Search .............................. 320/115, 114; 429/96–100

(56) References Cited

U.S. PATENT DOCUMENTS 5,815,426 A * 9/1998 Jigour et al. .................. 365/51
6,047,198 A * 4/2000 Sudo .......................... 455/566

* cited by examiner

Primary Examiner—Edward H. Tso
Assistant Examiner—Lawrence Luk
(74) Attorney, Agent, or Firm—Pro-Techtor International Services

(57) ABSTRACT

A mobile phone SIM card switching unit includes a transmission line, a connecting head connected to an end of the transmission line for connecting to an SIM card socket on a mobile phone, and a socket base connected to the other end of the transmission line. The socket base is provided with SIM card sockets for each receiving an SIM card therein, and a switch for controlling an electrical connection of one of the SIM cards on the socket base to the mobile phone connected to the socket base via the connecting head and the transmission line. The switch of the SIM card switching unit enables the mobile phone to quickly and conveniently switch among different mobile communication network systems to always obtain good communication quality.

5 Claims, 6 Drawing Sheets

MOBILE PHONE SIM CARD SWITCHING UNIT

FIELD OF THE INVENTION

The present invention relates to a mobile phone subscriber identity module (SIM) card switching unit, and more particularly to a mobile phone SIM card switching unit that enables electrical connection of several different SIM cards on the switching unit to a mobile phone having only one SIM card socket via a transmission line of the switching unit, so that good communication quality over different mobile communication network systems can be conveniently obtained through only one mobile phone.

BACKGROUND OF THE INVENTION

A conventional mobile phone, such as the commonly used GSM900 handset and GSM1800 handset, is provided with an internal socket for receiving a subscriber identity module (SIM) card provided by respective mobile communication network system providers. By putting an SIM card in the SIM socket in the mobile phone, a user is allowed to connect to and communicate or use other services over a specific mobile communication network.

The mobile communication network system providers do not necessarily establish their bases at the same sites to always provide good communication quality at all places. It is possible for a certain mobile communication network system provider to have bases established at some places and therefore provide better communication quality at these places but poorer at other places. To overcome this problem and to always have good communication quality over mobile communication networks, some users would carry two or more mobile phones. It is, of course, inconvenient for a user to carry so many mobile phones at one time.

SUMMARY OF THE INVENTION

It is therefore a primary object of the present invention to provide a mobile phone SIM card switching unit on which one or more SIM card sockets are provided to each receive an SIM card therein, and at least one switch is provided thereon to control the electrical connection of a desired SIM card on the switching unit to a mobile phone connected to the switching unit, so that a user needs only to operate the switch of the SIM card switching unit to quickly and conveniently switch among different mobile communication network systems to always obtain the best communication quality with only one single mobile phone.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
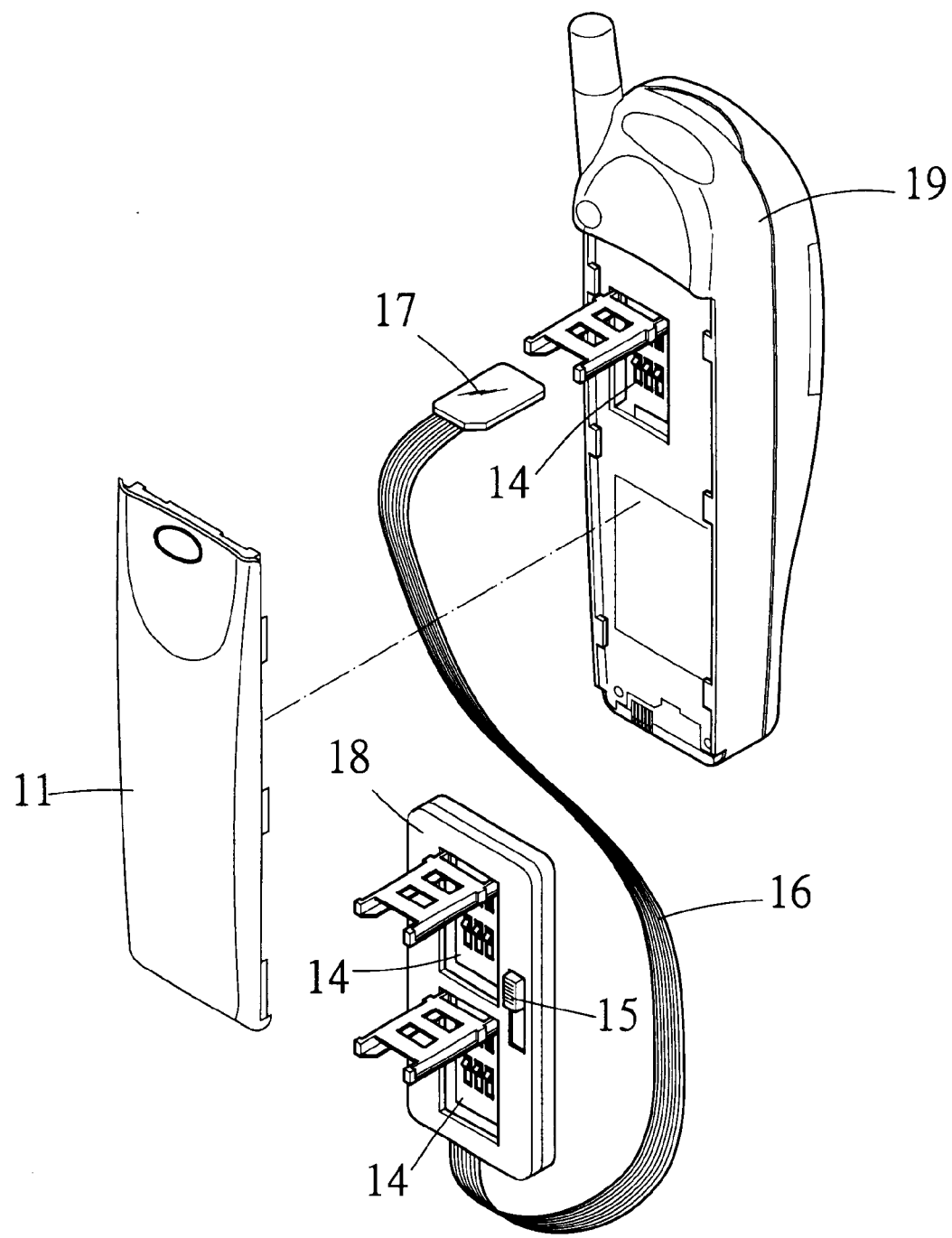
FIG. 1 is a perspective of a mobile phone SIM card switching unit according to a first preferred embodiment of the present invention.
Figure 2:
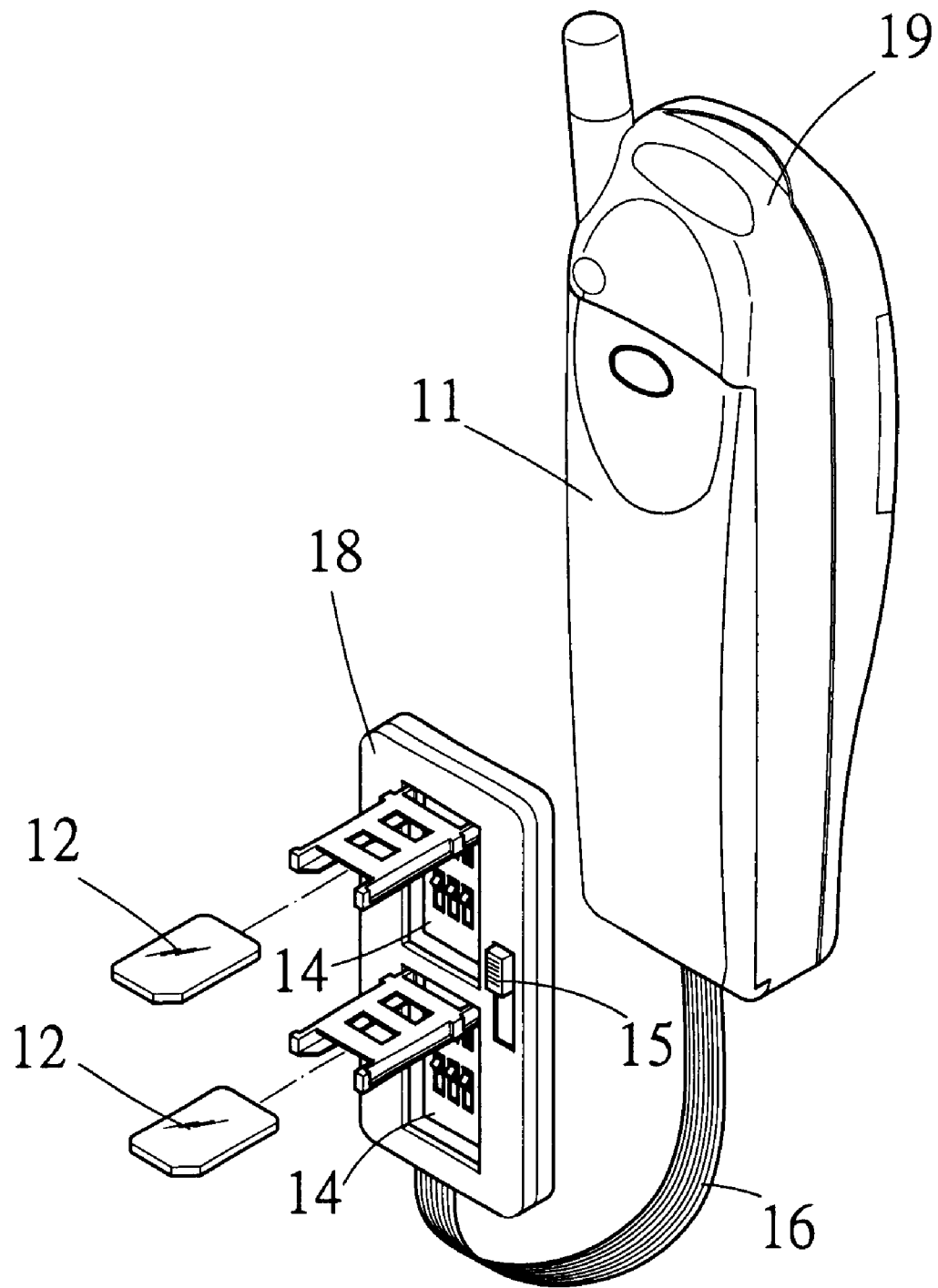
FIG. 2 is a perspective showing the connection of the SIM card switching unit of FIG. 1 to a mobile phone.
Figure 3:
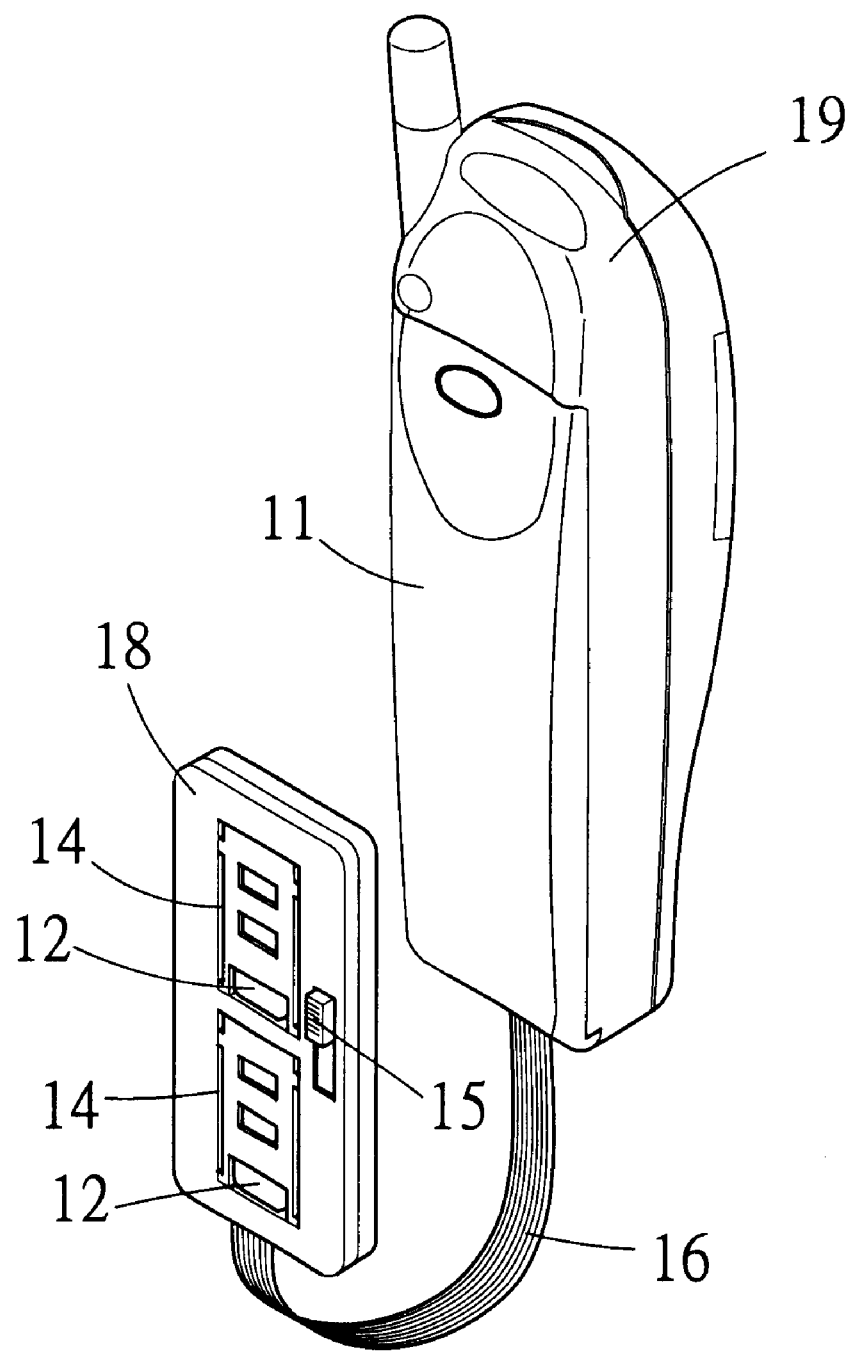
FIG. 3 is a perspective showing the connection of the SIM card switching unit of FIG. 1 to a mobile phone and SIM cards.

Please refer to FIGS. 1, 2 and 3 in which a mobile phone SIM card switching unit according to a first preferred embodiment of the present invention is shown. As can be seen from the drawings, the mobile phone SIM card switching unit mainly includes a transmission line 16, a connecting head 17 connected to an end of the transmission line 16 for connecting to an SIM card socket on a mobile phone 19 having a first back cover 11, and a socket base 18 connected to the other end of the transmission line 16. On the socket base 18, there is provided at least one SIM card socket 14 for each receiving an SIM card 12 therein. The socket base 18 is adapted to connect to a GSM handset or mobile phone 19 via the transmission line 16 by connecting the connecting head 17 to an SIM card socket 14 provided on the mobile phone 19, and thereby at least one SIM card 12 received in the at least one SIM card socket 14 on the socket base 18 is electrically connected to the mobile phone 19. At least one switch 15 is provided on the socket base 18 for selecting a desired SIM card 12 on the socket base 18 and controlling the electrical connection of the selected SIM card 12 to the mobile phone 19. The at least one SIM card socket 14 is not necessarily restricted to locate at only one surface of the socket base 18, and the at least one switch 15 is not necessarily restricted to locate at a side surface of the socket base 18. Instead, the at least one switch 15 may be located at any one surface or at the same one surface of the socket base 18. Moreover, the at least one switch 15 may be an electronic switch or any other suitable type of switch so long as it is operative to achieve the intended purpose of the present invention. It is also possible to provide more than one socket base 18 to connect to the mobile phone 19 without adversely affecting the structure and function of the present invention.

Figure 4:
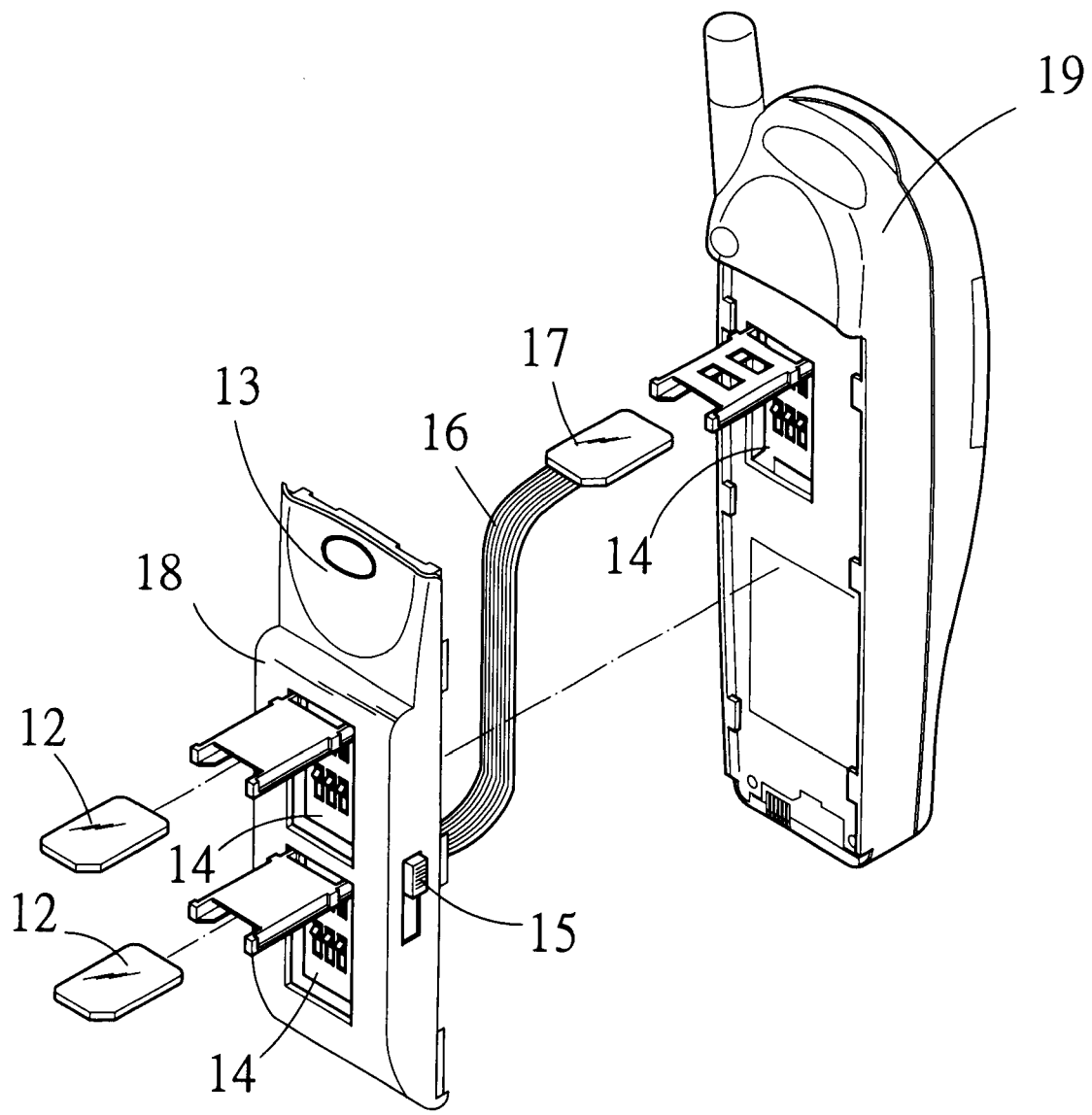
FIG. 4 is a perspective showing a mobile phone SIM card switching unit according to another preferred embodiment of the present invention and the connection of it to a mobile phone and SIM cards.
Figure 5:
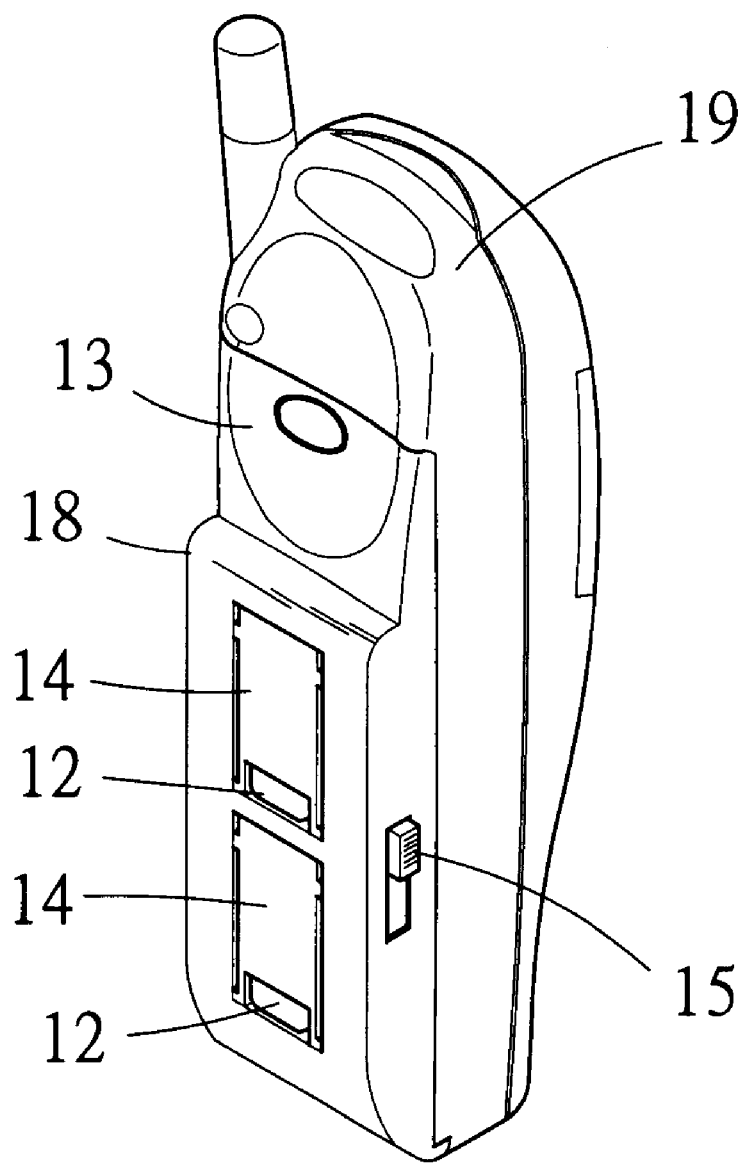
FIG. 5 is an assembled perspective of a mobile phone with the SIM card switching unit of FIG. 4 and additional SIM cards connected thereto.

FIGS. 4 and 5 illustrates another preferred embodiment of the present invention. In this embodiment, the mobile phone SIM card switching unit of the present invention also includes a transmission line 16 and a connecting head 17 connected to an end of the transmission line 16, just the same as that provided in the first embodiment. This second embodiment is, however, provided with a socket base 18 that is integrated into a second back cover 13 of a mobile phone 19. With the socket base 18 combined with the second back cover 13 to form an integral body, the at least one SIM socket 14 provided on the socket base 18 is externally accessible while the transmission line 16 and the connecting head 17 are sealed in the mobile phone 19. This design enables convenient carriage and use of the mobile phone SIM card switching unit of the present invention and protects the transmission line 16 from being damaged. The socket base 18 is not necessarily restricted to locate at one outer surface of the second back cover 13. The socket base 18 may also be located at an inner surface or a side surface of the second back cover 13, or even at any two of the surfaces of the second back cover 13. Alternatively, the second back cover 13 may be replaced with a battery for the mobile phone 19.

Figure 6:
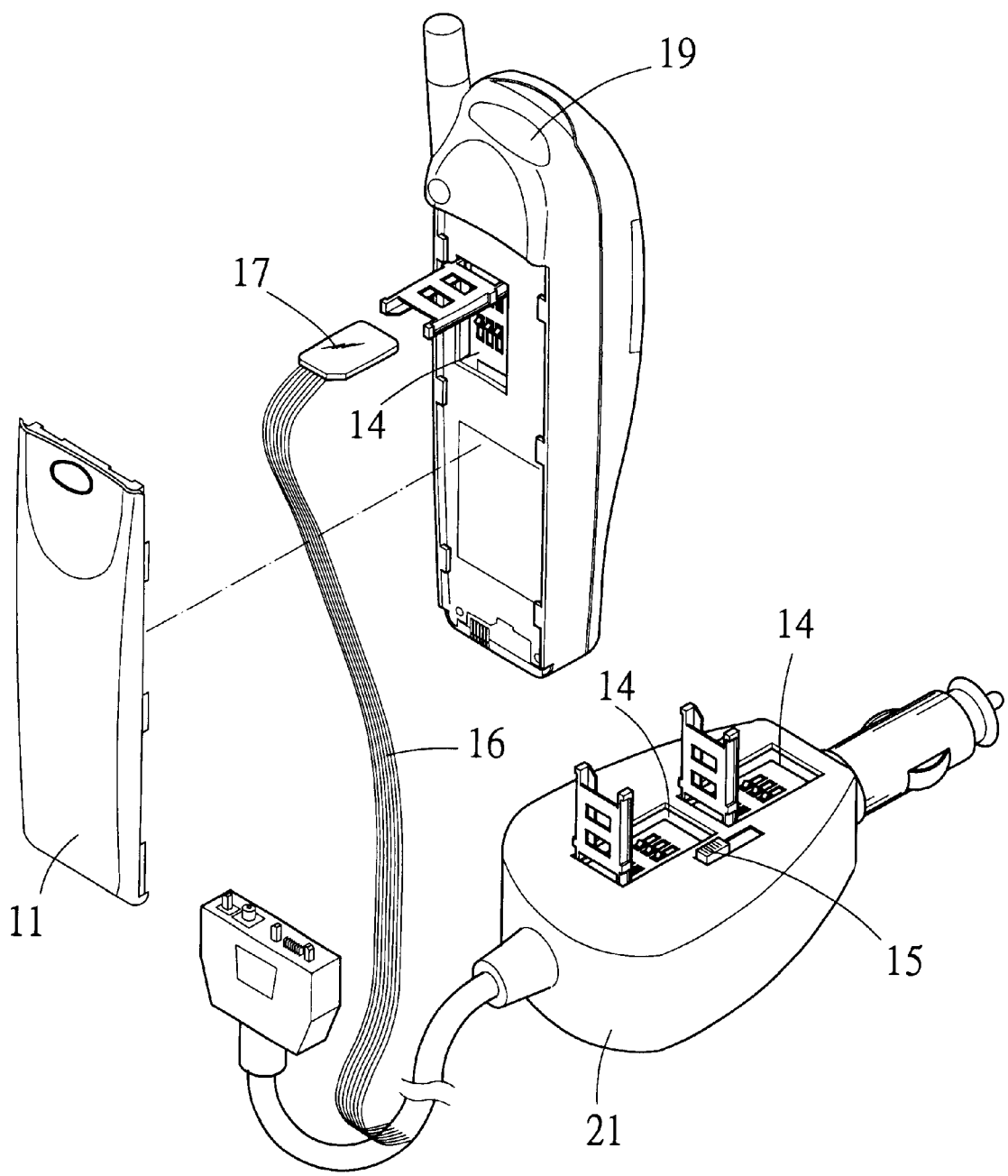
FIG. 6 is a perspective showing a mobile phone SIM card switching unit according to a further preferred embodiment of the present invention.

Please now refer to FIG. 6 that shows a mobile phone SIM card switching unit according to a further preferred embodiment of the present invention. As shown, the SIM switching unit of this third embodiment also includes a transmission line 16 and a connecting head 17 connected to an end of the transmission line 16 as in the previous two embodiments. This third embodiment is, however, provided with a socket base 18 integrated into a charger 21 for the mobile phone 19. The combination of the socket base 18 with the charger 21 enables the mobile phone 19 to have reduced components and can therefore be used in a more convenient manner.

The present invention has been described with a preferred embodiment thereof and it is understood that there is not restriction to the type of the mobile phone 19, the transmission line 16 and the SIM card 12 with which the mobile phone SIM card switching unit of the present invention is used, and that the numbers of the SIM card socket 14, the switch 15, the transmission line 16 and the socket base 18 are not restricted to any particular number. Many changes and modifications in the described embodiment can be carried out without departing from the scope of the invention which is intended to be limited only by the appended claims.

What is claimed is:

1. A mobile phone SIM card switching unit, comprising:
   a transmission line,
   a connecting head connected to a first end of said transmission line for connecting to an SIM card socket on a mobile phone,
   at least one switching means, and
   a socket base connected to a second end of said transmission line; wherein
   said socket base is provided with at least one SIM card socket to receive an SIM card therein, and
   said switching means controls an electrical connection of said SIM card received in said at least one SIM card socket to said mobile phone connected to said connecting head.

2. The A mobile phone SIM card switching unit as claimed in claim 1, wherein:
   said socket base is integrated into at least one surface of a charger for said mobile phone.

3. The mobile phone SIM card switching unit as claimed in claim 1, wherein:
   said socket base is integrated into at least one surface of a back cover of said mobile phone.

4. The mobile phone SIM card switching unit as claimed in claim 3, wherein:
   said socket base is integrated into an outer side of said back cover of said mobile phone to expose said at least one SIM card socket provided on said socket base.

5. The mobile phone SIM card switching unit as claimed in claim 3, wherein:
   said back cover is replaceable with a battery for said mobile phone.

* * * * *